(12) United States Patent
Kashikar

(10) Patent No.: US 7,711,744 B1
(45) Date of Patent: May 4, 2010

(54) SIMPLE AND FAST DIRECTORY SEARCH WITH REDUCED KEYSTROKES AND REDUCED SERVER CALLS

(75) Inventor: Swapnil Kashikar, Schaumburg, IL (US)

(73) Assignee: 3Com Corporation, Marlborough, MA (US)

( * ) Notice: Subject to any disclaimer, the term of this patent is extended or adjusted under 35 U.S.C. 154(b) by 70 days.

(21) Appl. No.: 11/334,136

(22) Filed: Jan. 18, 2006

(51) Int. Cl.
*G06F 7/00* (2006.01)
*G06F 17/30* (2006.01)

(52) U.S. Cl. ........................... 707/769; 707/922
(58) Field of Classification Search ............... None
See application file for complete search history.

(56) References Cited

U.S. PATENT DOCUMENTS

| | | | |
|---|---|---|---|
| 4,341,929 A | 7/1982 | Alexander et al. | 379/359 |
| 5,818,437 A | 10/1998 | Grover et al. | 715/811 |
| 5,953,541 A | 9/1999 | King et al. | 710/67 |
| 6,005,927 A | 12/1999 | Rahrer et al. | 379/142.01 |
| 6,208,713 B1 | 3/2001 | Rahrer et al. | 379/67.1 |
| 6,307,548 B1 | 10/2001 | Flinchem et al. | 715/811 |
| 6,307,549 B1 | 10/2001 | King et al. | 715/810 |
| 6,345,094 B1* | 2/2002 | Khan et al. | 379/266.07 |
| 6,370,518 B1* | 4/2002 | Payne et al. | 707/1 |
| 6,557,004 B1* | 4/2003 | Ben-Shachar et al. | 707/102 |
| 6,950,988 B1* | 9/2005 | Hawkins et al. | 715/700 |
| 6,978,206 B1* | 12/2005 | Pu et al. | 701/200 |
| 2002/0001380 A1 | 1/2002 | Narusawa | 379/355.02 |
| 2002/0126097 A1 | 9/2002 | Savolainen | 345/168 |
| 2002/0152203 A1 | 10/2002 | Ostergaard et al. | 707/3 |
| 2003/0014449 A1 | 1/2003 | Makabe et al. | 715/532 |
| 2004/0240660 A1 | 12/2004 | Wong et al. | 379/355.01 |
| 2005/0041011 A1 | 2/2005 | Silfverberg et al. | 345/156 |
| 2005/0171933 A1* | 8/2005 | Stepanich et al. | 707/3 |
| 2006/0123354 A1* | 6/2006 | Volovitz | 715/780 |

FOREIGN PATENT DOCUMENTS

EP   1 035 712 B1   4/2003

\* cited by examiner

*Primary Examiner*—Kavita Padmanabhan
*Assistant Examiner*—Jeremy D Engelskirchen
(74) *Attorney, Agent, or Firm*—McDonnell Boehnen Hulbert & Berghoff LLP

(57) ABSTRACT

Methods are provided for identifying user-directory records that match input strings entered into a packet-based telephone. Each input string comprises symbols associated with character sets, and each record comprises multiple attributes. A record matches a set of input strings when, independent of the order of the input strings, there is a one-to-one correspondence matching the input strings with an equal number of attributes of the record. An input string matches an attribute when, on a character-by-character, symbol-by-symbol basis, the characters of at least a portion of the attribute are elements of the character sets associated with the symbols of the input string. Subsets of matching records are dynamically sent to the packet-based telephone for display.

23 Claims, 7 Drawing Sheets

| | FIRST NAME | MIDDLE NAME | LAST NAME | EXTENSION | DEPARTMENT |
|---|---|---|---|---|---|
| 402 | SCOTT | MICHAEL | ANDERSON | 2678 | ENGINEERING |
| 404 | DARLENE | [NULL] | APPIER | 5478 | SALES |
| 406 | CARLA | T | BEAUMONT | 9584 | SALES |
| 408 | ARNOLD | [NULL] | BILLINGS | 3000 | ENGINEERING |
| 410 | SUZANNE | A | BOSTON | 6587 | ENGINEERING |
| 412 | JOHN | P | CARTER | 6523 | RESEARCH |
| 414 | PAUL | WILLIAM | CASHMAN | 8525 | SALES |
| 416 | SUSAN | [NULL] | EVANS | 1548 | RESEARCH |
| 418 | HARRY | C | MICHAELS | 2574 | ENGINEERING |
| 420 | MICHAEL | JOHN | HARRIGAN | 2635 | RESEARCH |
| 422 | SARAH | M | JACKSON | 4781 | ENGINEERING |
| 424 | ANNE | MARIE | LEWIS | 4782 | ENGINEERING |
| 426 | HARRY | [NULL] | MADIGAN | 7414 | ENGINEERING |
| 428 | PAULA | A | NORMAN | 7596 | SALES |
| 430 | WILLIAM | [NULL] | PETERS | 7415 | RESEARCH |
| 432 | JOHN | JACOB | SMITH | 8545 | SALES |
| 434 | PAUL | T | WILLIAMS | 3257 | SALES |
| 436 | PATRICK | [NULL] | WILSON | 1547 | ENGINEERING |

USER DIRECTORY TABLE 400

FIG. 4

| CALLING EXTENSION | CALLED EXTENSION | RELEVANCE |
|---|---|---|
| 1547 (PATRICK WILSON) | 4781 (SARAH JACKSON) | 10 |
| 1547 (PATRICK WILSON) | 6587 (SUZANNE BOSTON) | 9 |
| 1547 (PATRICK WILSON) | 1548 (SUSAN EVANS) | 4 |
| 1547 (PATRICK WILSON) | 2678 (SCOTT ANDERSON) | 2 |
| 2678 (SCOTT ANDERSON) | 2635 (MICHAEL HARRIGAN) | 4 |
| 2678 (SCOTT ANDERSON) | 2574 (HARRY MICHAELS) | 3 |
| 2678 (SCOTT ANDERSON) | 7414 (HARRY MADIGAN) | 2 |
| 2678 (SCOTT ANDERSON) | 3257 (PAUL WILLIAMS) | 1 |
| 6523 (JOHN CARTER) | 7415 (WILLIAM PETERS) | 8 |
| 6523 (JOHN CARTER) | 1547 (PATRICK WILSON) | 7 |
| 6523 (JOHN CARTER) | 8525 (PAUL CASHMAN) | 2 |
| 7596 (PAULA NORMAN) | 8525 (PAUL CASHMAN) | 6 |
| 7596 (PAULA NORMAN) | 1547 (PATRICK WILSON) | 5 |
| 7596 (PAULA NORMAN) | 3257 (PAUL WILLIAMS) | 2 |
| 7596 (PAULA NORMAN) | 7415 (WILLIAM PETERS) | 1 |
| 8545 (JOHN SMITH) | 4782 (ANNE LEWIS) | 1 |
| 9584 (CARLA BEAUMONT) | 2678 (SCOTT ANDERSON) | 3 |
| 9584 (CARLA BEAUMONT) | 6587 (SUZANNE BOSTON) | 1 |

RELEVANCE TABLE 500

FIG. 5

SIMPLE AND FAST DIRECTORY SEARCH WITH REDUCED KEYSTROKES AND REDUCED SERVER CALLS

BACKGROUND

1. Technical Field

The present methods are related to identifying matching user-directory records in a database and, more particularly, to an improved searching technique that reduces the number of keystrokes and the number of server calls needed to identify matching records.

2. Description of Related Art

Since the development of the telephone more than one hundred years ago, the prevalence and importance of telephones have continued to grow. For most of that time, users have used circuit-switched telephones to communicate over circuit-switched networks such as the Public Switched Telephone Network (PSTN).

Eventually, Private Branch Exchange (PBX) systems were developed to serve the needs of, for example, businesses with many employees. PBX systems typically include a central entity that connects callers within an office system to each other, and to the PSTN via "outside lines." PBX systems are typically arranged such that each user has assigned to them a phone number such as 555-555-1234. An outside caller calling this number would be routed by the central entity to the telephone associated with the "1234" extension. A user within the system typically would be able to reach the same endpoint by dialing only the extension.

Certain features have been developed for use in PBX systems. For example, a "caller ID" feature has been developed whereby, when a user having an extension such as 1234 calls another user having an extension such as 5678, the called party's telephone may display information related to the caller, such as the "1234" extension and/or the caller's name. To provide such features, telephones have been developed specifically for PBX implementations. These telephones typically have a display, such as an LCD, as well as some number of buttons designed to correspond to some number of provided features.

Recently, the popularity of the Internet has risen dramatically. Along with the rise of the Internet has come Internet or packet-based telephony, also known as IP (Internet Protocol) telephony, or VoIP (Voice over IP). In packet-based telephony, users' audible inputs are converted to digital data, which is then packetized, or broken into multiple packets, and transmitted using a packet-switched protocol such as IP. Incoming packet data is then arranged in the proper sequence, converted to analog sounds, and output to a user. If one party is using a packet-based telephone and the other party is using a conventional telephone connected to the PSTN, a media gateway may convert between the two types of data transmission.

Increasingly, companies and other institutions are transitioning from PBX systems to packet-based telephony systems. Since most of these institutions already have packet-switched networks to manage data communications such as e-mail, employing a packet-based telephony system obviates the need to also have a circuit-switched network for telephony purposes such as telephone calls and fax messaging. Predictably, packet-based telephones have been developed for use in these systems. Like their PBX counterparts, these packet-based telephones typically have at least a display screen (such as an LCD) and a number of buttons, which may be programmable to provide a number of features.

Among the features that have been developed for packet-based telephones is a user directory. To use this feature, a user would typically press a button to launch a user-directory application. The packet-based telephone may then display one or more user-directory records (e.g., name and extension). The user may scroll through the records and/or use the telephone's number pad to jump to entries beginning with a certain letter of the alphabet. Furthermore, the user typically has the option to place a call to an extension or telephone number associated with a displayed record, perhaps by pressing one or more buttons or by picking up a handset.

SUMMARY

Methods are provided for simple and fast directory search with reduced keystrokes and reduced server calls. In one aspect, an embodiment may take the form of a method. In accordance with the method, a set of input strings is provided, perhaps via entry by a user manipulating a keypad of a packet-based telephone. The set of input strings consists of a first input string and a second input string, each of which consist of one or more symbols. Each symbol is associated with a respective character set. Database records are provided, each comprising two or more attributes. Each attribute comprises one or more characters.

A first list of records is identified in response to the first input string. Each record of the first list includes an attribute matching the first input string. An attribute matches an input string when, on a character-by-character, symbol-by-symbol basis, the characters of at least a portion of the attribute are elements of the character sets associated with the symbols of the input string.

A second list of records is identified from the first list in response to the second input string. Each record of the second list includes two separate and distinct attributes wherein, independent of the order of the input strings, one of the two attributes matches the first input string and the other matches the second input string, wherein different records can match the input strings with respect to different attributes. Dynamically-updated subsets of the first and second lists are provided to the packet-based telephone for display.

These as well as other aspects and advantages will become apparent to those of ordinary skill in the art by reading the following detailed description, with reference where appropriate to the accompanying drawings.

BRIEF DESCRIPTION OF THE DRAWINGS

Various examples of embodiments are described herein with reference to the following drawings, wherein like numerals denote like entities.

FIG. 4 is a simplified block diagram of an example of a user-directory table that may be used in accordance with examples of embodiments;

FIG. 5 is a simplified block diagram of an example of a relevance table that may be used in accordance with examples of embodiments;

DETAILED DESCRIPTION OF THE DRAWINGS

1. Overview

Figure 1:
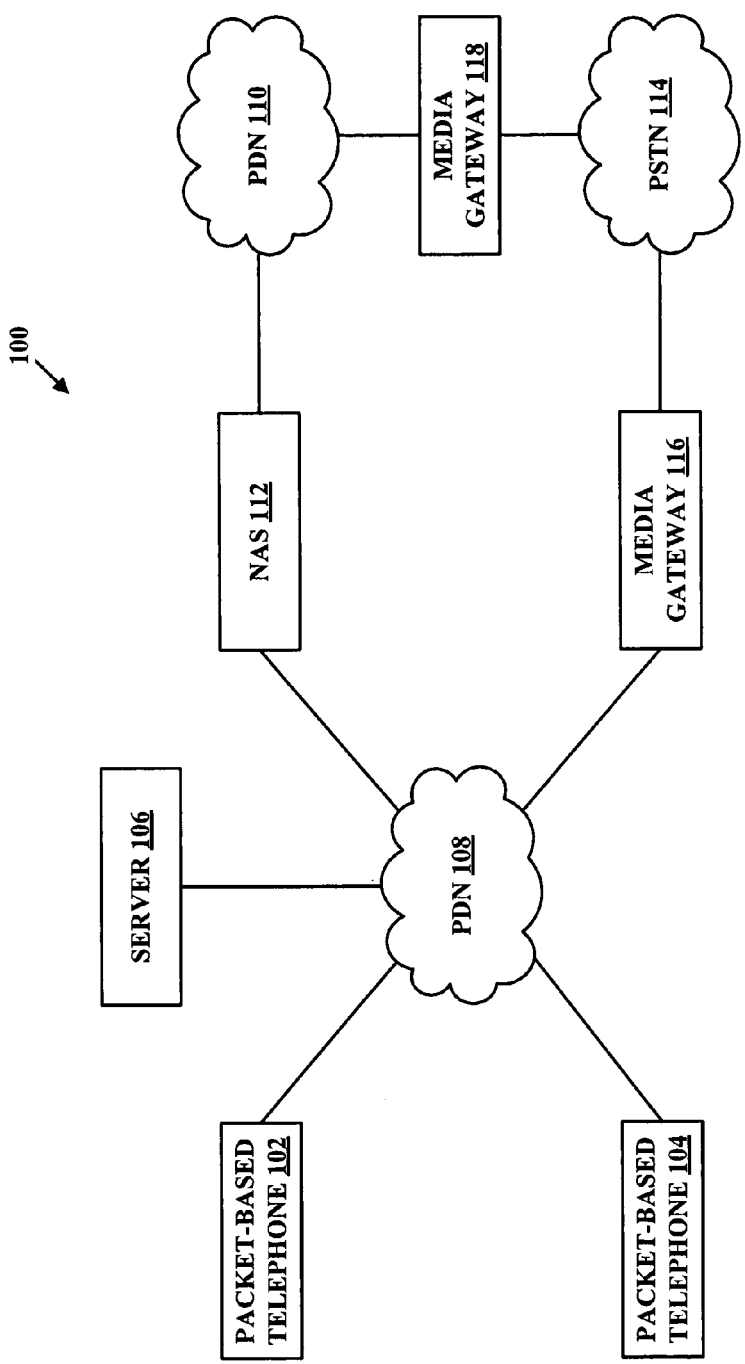
FIG. 1 is a simplified block diagram of an example of a communication system that may be used in accordance with examples of embodiments.

The present methods provide improved identification of desired user-directory records. As one application, the present methods may be employed in the context of an enterprise that maintains multiple packet-based telephones communicatively connected over a packet-data network. Each packet-based telephone may be associated with a user such as an employee. Furthermore, the enterprise may maintain a server dedicated at least in part to maintaining a database of user-directory records, and to serving requests from the packet-based telephones for particular user-directory records. Each of these records includes multiple attributes, such as first name, last name, middle initial, telephone number, extension, and/or any others. Each of these attributes may take the form of a string of one or more characters.

A given user in this context may operate a packet-based telephone to search for a particular record. To do so, the user may initiate a user-directory search session by pressing one or more buttons, selecting one or more menu options, or in some other way interacting with a user interface of the packet-based telephone to use a user-directory function. To then indicate which record is the desired record, the user may sequentially press keys on a keypad of the packet-based telephone, to spell out one or more attributes of the desired record.

Typically, telephones include a keypad having twelve buttons: one for each digit 0-9, a "*" key, and a "#" key. Furthermore, each of the digits 2-9 is typically associated with three or four letters of the alphabet. For example, the "7" key is typically associated not only with the number {7}, but also with the letters {p, q, r, s}. In this way, the "7" key can be characterized as being associated with the character set {7, p, q, r, s}. Note that this keypad configuration is typical and is thus used for illustration; other configurations and input devices could be used.

Thus, in some examples of embodiments, users may ambiguously spell out attributes by pressing one key for each character they intend to input; in other examples of embodiments, a multi-tapping approach may be used to unambiguously enter characters. In preferred embodiments, the former approach is employed, to reduce the number of keystrokes necessary to arrive at a desired user-directory record. Furthermore, to enable a user to delimit inputs into a set of input strings, a key such as the "#" key could be designated as a delimiter or space.

With each keystroke, the packet-based telephone may send a request to a server that includes the keystrokes entered up to that point. Alternatively, the telephone may send requests that include only the most recently entered keystroke. Other approaches could be used as well. Each keystroke may be represented by a symbol that is associated with the particular key and with the character set associated with that key. Each request may thus be associated with one or more input strings, the number of input strings depending on the number of delimiting inputs entered by the user. These sets of input strings could be included in the requests themselves, or maintained by the server in response to receiving requests associated with individual keystrokes.

Upon receipt of the first such request, the server may identify a list of user-directory records that match the symbol associated with the first keystroke. The server may do so by searching among the user-directory records for those records that match that symbol. In general, a record matches a set of input strings when, independent of the order of the input strings, there is a one-to-one correspondence matching input strings to an equal number of attributes of the record. Furthermore, an input string matches an attribute when the character sets associated with the symbols of the input string include the characters of at least a portion of the attribute on a symbol-by-symbol, character-by-character basis, as further described and illustrated herein.

With respect to the symbol associated with the first keystroke, the search for matching records may thus take the form of searching for records that have at least one attribute that begins with a character included in the character set associated with that symbol. This would include attributes—such as telephone number—that begin with a digit in the character set, as well as attributes—such as last name—that begin with a letter in the character set. As another option, the server may access a pre-populated list of records maintained for that symbol.

Each subsequent request, perhaps sent by the telephone in response to each subsequent non-delimiting keystroke, will thus correspond to one or more input strings. Regardless of the number of input strings associated with each request, the server searches among the records identified in connection with the previous request for records that match the current request. In so doing, the server will use the input-string-order-independent matching criteria described herein. Thus, a user may partially or completely input any number of attributes in any order.

The server sends a reply to the packet-based telephone corresponding to each such request. Each such reply includes a subset of the records identified as matching the input strings of the corresponding request. Note that each such subset could include some or all of the records from the corresponding list of matching records. Furthermore, in some embodiments, the subset could be selected and sorted in order of decreasing relevance to the user of the packet-based telephone, such that the records of the subset will be displayed in that order.

At a certain point, the number of matching records may fall below a maximum number of records that can fit in a particular reply (i.e., a message size), or perhaps that the packet-based telephone can handle at one time (i.e., a cache size of the packet-based telephone). At that point, the server may, in addition to sending all of those matching records to the telephone, also send an indication that there are no additional matching records. The telephone may respond to that indication by no longer sending requests over the network to the server, and may instead locally search that last set of records using a matching algorithm similar to that described above.

Finally, when the packet-based telephone is displaying the desired record, the user may input a command to place a call to a telephone number or extension associated with that displayed record. This command may take the form of pressing a speakerphone button, some other button or sequence of buttons, or perhaps simply picking up a handset.

There are of course additional aspects of the present methods. As such, this overview is not meant to be exhaustive but rather illustrative. It should be appreciated, however, that the methods described herein improve upon existing user-directory implementations for at least the reasons that the present methods involve a reduced number of keystrokes by the user and a reduced number of server calls by the packet-based telephone to identify desired records.

2. Example Architecture a. Example Communication System

FIG. 1 is a simplified block diagram of an example of a communication system that may be used in accordance with examples of embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communication system 100 includes packet-based telephones 102 and 104, a server 106, packet-data networks (PDN) 108 and 110, a network access server (NAS) 112, a public switched telephone network (PSTN) 114, and media gateways 116 and 118. It should be understood that any number of additional network entities could be present as well. As examples, there could be any number of packet-based telephones and other devices in communication with the PDN 108. Furthermore, there could be any number of intermediate devices and networks making up all or part of any of the communication links. For example, there could be one or more routers on the link between the NAS 112 and the PDN 110.

The packet-based telephones 102 and 104 may be any packet-based telephony devices programmed to carry out the packet-based-telephone functions described herein. As such, the packet-based telephones 102 and 104 may each include a user interface, a communication interface, a processor, and data storage. The packet-based telephones 102 and 104 may be communicatively coupled with at least the PDN 108, and may be capable of communicating with the PDN 108 in a wired and/or wireless manner. Packet-based telephone 102 is further described in connection with FIG. 2.

The server 106 may be any networking device programmed to carry out the server functions described herein. As such, the server may include a communication interface, a processor, and data storage. The server 106 may be communicatively coupled with at least the PDN 108, and may be capable of communicating with the PDN 108 in a wired and/or wireless manner. The server 106 is further described in connection with FIG. 3.

The PDN 108 may be communicatively coupled with at least the packet-based telephones 102 and 104, the server 106, the NAS 112, and the media gateway 116, and may include one or more wide area networks, one or more local area networks, one or more public networks, one or more private networks, and/or one or more wired or wireless networks. Devices in communication with the PDN 108 may exchange data using a packet-switched protocol such as the Internet Protocol (IP), and may be identified by an address such as an IP address.

The PDN 110 may be communicatively coupled with at least the NAS 112 and the media gateway 118, as well as likely numerous other devices, and may include one or more wide area networks, one or more local area networks, one or more public networks such as the Internet, one or more private networks, and/or one or more wired or wireless networks. Devices in communication with the PDN 110 may exchange data using a packet-switched protocol such as the Internet Protocol (IP), and may be identified by an address such as an IP address.

Note that FIG. 1 depicts the PDN 108 as a privately-operated IP network (such as an enterprise's corporate network) and the PDN 110 as a public IP network (such as or including the Internet). This arrangement is merely illustrative, as there is no reason that the packet-based telephones 102 and 104, the server 106, and any other device shown herein could not communicate with each other and with other entities at least in part over a single packet-data network such as or including the Internet. And other arrangements are possible as well.

The PSTN 114 may be the circuit-switched network known as the Public Switched Telephone Network, and may be communicatively coupled with at least the media gateway 116 and the media gateway 118, as well as with numerous other switches and telephony devices.

The NAS 112 may be any networking device programmed to interface between the PDN 108 and the PDN 110. As such, the NAS 112 may include a processor, data storage, and at least one communication interface. The NAS 112 may be programmed to communicate in a wired and/or wireless manner with the PDN 108 and/or the PDN 110. The NAS 112 may act as a network access server with respect to the PDN 108, and could take the form of a router.

The media gateways 116 and 118 may be devices programmed to interface between a PDN and the PSTN 114, and may thus have a processor, data storage, an interface for communicating with a PDN, and another interface for communicating with the PSTN 114. The media gateways may thus receive packet-based communications from a PDN, convert those communications to a circuit-switched format, and transmit those communications to the PSTN. The media gateways may also receive circuit-switched communications from the PSTN, convert those communications to a packet-based format, and transmit those communications to a PDN.

b. Example Packet-Based Telephone

Figure 2:
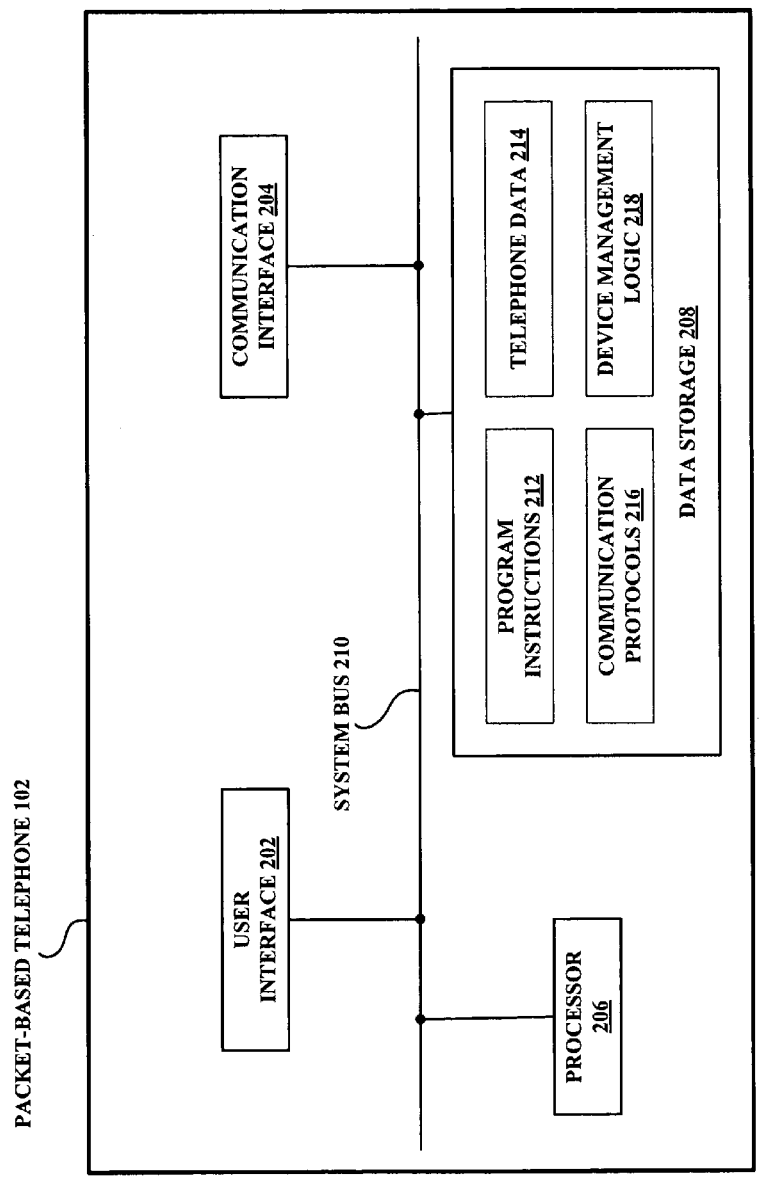
FIG. 2 is a simplified block diagram of an example of a packet-based telephone that may be used in accordance with examples of embodiments.

FIG. 2 is a simplified block diagram of an example of a packet-based telephone that may be used in accordance with examples of embodiments. In particular, FIG. 2 shows that the packet-based telephone 102 of FIG. 1 includes a user interface 202, a communication interface 204, a processor 206, and data storage 208, all of which may be communicatively linked by a system bus 210. The packet-based telephone 102 may be any device programmed to communicate over the PDN 108, and to carry out the packet-based-telephone functions described herein. Furthermore, it should be understood that the packet-based telephone 104 may have a structure similar to that described with respect to the packet-based telephone 102.

The user interface 202 may include one or more devices to receive user inputs, as well as one or more devices to convey outputs to users. For receiving inputs, the user interface 202 may include a microphone, one or more buttons, and/or any other device now known or later developed to receive user inputs. For conveying outputs, the user interface 202 may include a speaker, a display such as a liquid crystal display (LCD), one or more lights and/or light emitting diodes (LEDs) for indicating one or more states, and/or any other device now known or later developed to convey outputs to users.

The communication interface 204 may be used by the packet-based telephone 102 to engage in packet-switched communication over the PDN 108 with one or more devices such as the packet-based telephone 104, one or more other packet-based telephones, the server 106, and one or more other devices via the NAS 112 and/or the media gateway 116. As stated, the packet-based telephone may be capable of communicating over the PDN 108 in a wired and/or wireless manner. As such, the communication interface 204 may include an Ethernet card, and may also or instead include a chipset and antenna to facilitate wireless communication.

The processor 206 may comprise multiple (e.g., parallel) processors, such as a general purpose microprocessor and/or a discrete digital signal processor. The data storage 208 may take various forms, in one or more parts, such as a non-volatile storage block and/or a removable storage medium. The data storage 208 may store program instructions 212, telephone data 214, communication protocols 216, and device management logic 218. The program instructions 212 may be executable by the processor 206 to carry out various functions described herein. The telephone data 214 may include user-directory data, and/or any other types of data.

Communication protocols 216 may be useful to receive data from and send data to one or more network entities, and may include any protocols suited to carrying out the functions described herein, including any proprietary protocols and/or any other protocols. Compatible protocols may be stored in entities in communication with the packet-based telephone 102. The device management logic 218 may be used to manage aspects of the packet-based telephone 102 such as memory and file management.

c. Example Directory Server

Figure 3:
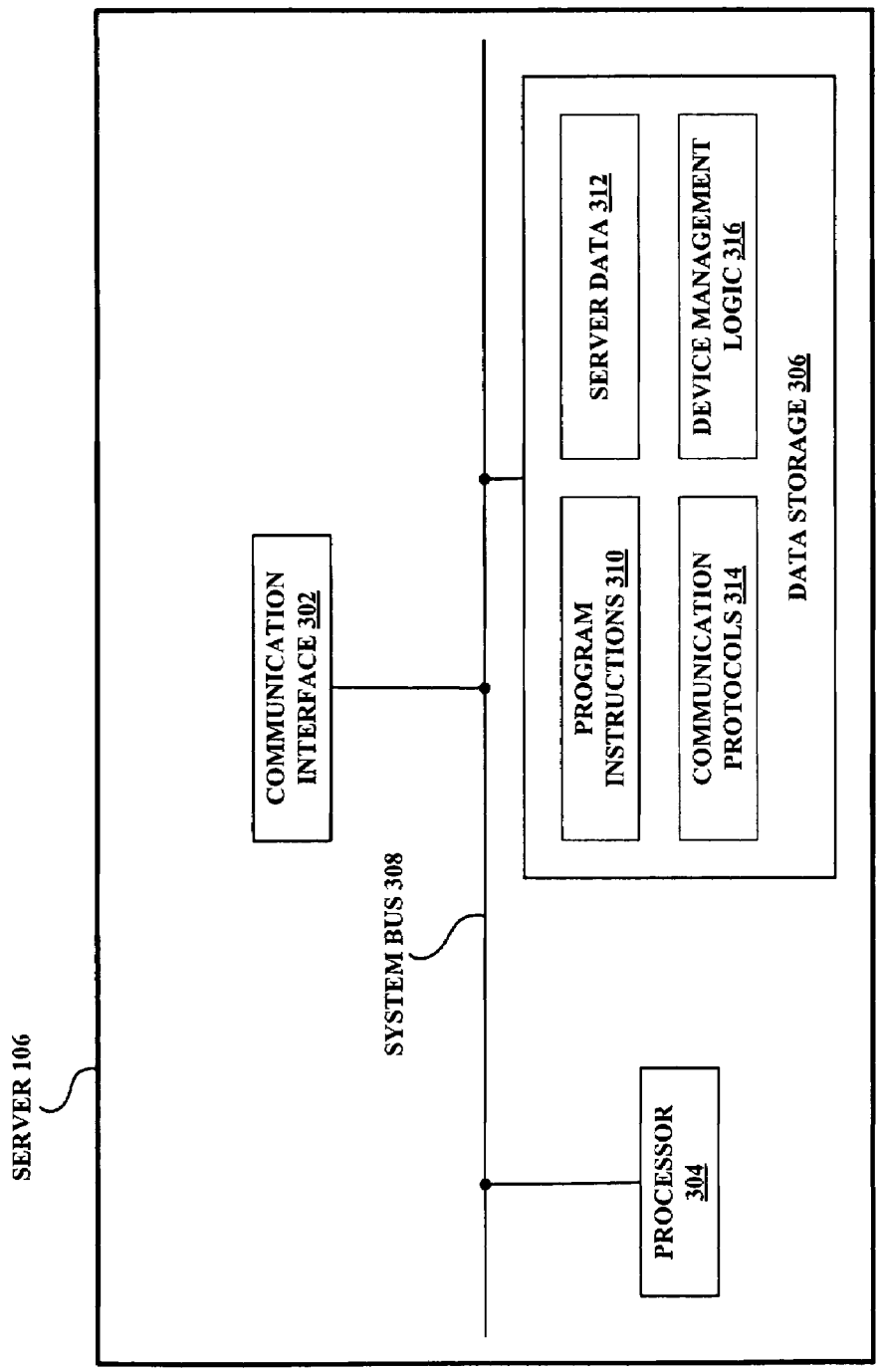
FIG. 3 is a simplified block diagram of an example of a server that may be used in accordance with examples of embodiments.

FIG. 3 is a simplified block diagram of an example of a server that may be used in accordance with examples of embodiments. In particular, FIG. 3 illustrates that the server 106 of FIG. 1 includes a communication interface 302, a processor 304, and data storage 306, all of which may be communicatively linked by a system bus 308. In general, the server 106 may be any networking device arranged to communicate over one or more networks, and to carry out the server functions described herein.

The communication interface 302 may be a combination of hardware and software used by the server 106 to communicate with the packet-based telephones 102 and 104, as well as possibly one or more additional entities, and may, for example, include an Ethernet card. The communication interface 302 may, instead or in addition, include a wireless-communication interface, which may enable it to communicate wirelessly with one or more devices.

The processor 304 may comprise multiple (e.g., parallel) processors, such as a general purpose microprocessor and/or a discrete digital signal processor. The data storage 306 may take various forms, in one or more parts, such as a non-volatile storage block and/or a removable storage medium. The data storage 306 may store program instructions 310, server data 312, communication protocols 314, and device management logic 316. The program instructions 310 may be executable by the processor 304 to carry out various server functions described herein. The server data 312 may include any type of data related to those functions, such as user-directory records and a relevance table, as described herein, as well as any other data.

The communication protocols 314 may be useful to receive data from and send data to one or more network entities, and may include any protocols suited to carrying out the functions described herein, including any proprietary protocols and/or any other protocols. Compatible protocols may be stored in entities in communication with server 106. The device management logic 316 may be used to manage aspects of server 106 such as memory and file management.

d. Example User Directory Table

FIG. 4 is a simplified block diagram of an example of a user-directory table that may be used in accordance with examples of embodiments. In particular, FIG. 4 illustrates a user-directory table 400 that may be stored as at least part of the server data 312 of FIG. 3. Note that the user-directory table 400 is merely an example of one way to organize user-directory records, and that other data structures and methods of organization could be used as well. Furthermore, while the user-directory table 400 depicts eighteen user-directory records, fewer or more than this number of user-directory records could be maintained by the server 106. Also, it is not necessary that the server 106 store the user-directory records. These records could be stored by another entity to which the server 106 has local or network access.

As shown in FIG. 4, user-directory table 400 depicts user-directory records 402-436, each having five attributes: first name, middle name, last name, extension, and department. This group of attributes is provided by way of example. Fewer, more, or different attributes could be used. Note that each attribute of each record comprises at least one character. However, certain records such as the record 404 have a "[NULL]" value stored in the middle name attribute. This should not be interpreted as that record having an attribute with zero characters; rather, the record 404 should be viewed as having four, rather than five, attributes. This may be necessary in cases where a particular person may simply not have a middle name.

The important thresholds that each of the records in the table 400 achieve are that they each have at least two attributes, and each of those attributes has at least one character. Note also that some records share the same value for certain attributes. For example, records 404 and 406 both have "SALES" in the department attribute. Similarly, records 412 and 432 both have "JOHN" in the first name attribute. In some embodiments, it could be required that no two records share the same value for some attributes, such as extension.

e. Example Relevance Table

FIG. 5 is a simplified block diagram of an example of a relevance table that may be used in accordance with examples of embodiments. In particular, FIG. 5 illustrates a relevance table 500 that may be stored as at least part of the server data 312 of FIG. 3. As a general matter, the relevance table 500 stores data that indicates, for one or more users, which other users are most relevant. Relevancy in this context could be defined any number of ways, as explained herein. In the example of FIG. 5, relevancy is defined simply as the raw number of times that a particular user (i.e., a calling extension) has called each other user (i.e., a called extension). In some embodiments, the relevance statistic could correspond to the number of calls from one user to another particular user in a particular time period, such as the past 30 days.

Note that, while the relevance table 500 depicts eighteen relevance records 502-536, fewer or more than this number of relevance records could be maintained by the server 106. Also, it is not necessary that the server 106 store the relevance records. These records could be stored by another entity to which the server 106 has local or network access. In some embodiments, instead of or in addition to the server 106 and/or other network entities, one or more of the packet-based telephones may store some or all of the relevance table 500.

Note that the relevance table 500 may be internally sorted in one or more ways. For example, the relevance table 500 of FIG. 5 is sorted first by calling extension, and within each calling extension by decreasing order of relevance. Thus, focusing on one calling extension for illustration, it can be seen that the relevance records 510-516, corresponding to the calling extension 2678 (associated with an example user named Scott Anderson), indicate in order that Scott Anderson has called extension 2635 (Michael Harrigan) four times, extension 2574 (Harry Michaels) three times, extension 7414 (Harry Madigan) twice, and extension 3257 (Paul Williams) once. However, other sorting arrangements may be used as well.

3. Example Operation a. A First Example Method

Figure 6:
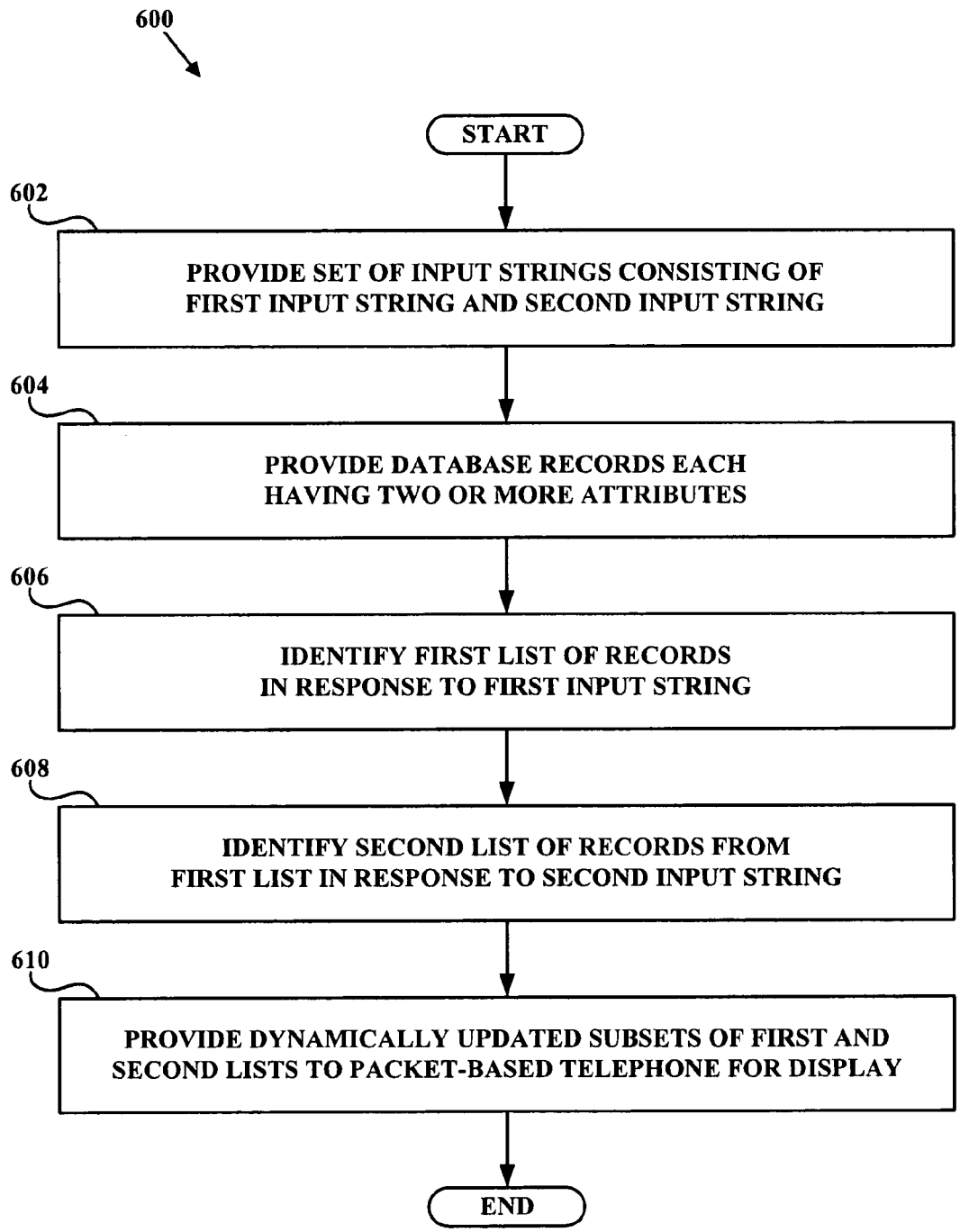
FIG. 6 is a flowchart of a first method that makes use of the communication system of FIG. 1, in accordance with examples of embodiments.

FIG. 6 is a flowchart of a first method that makes use of the communication system of FIG. 1, in accordance with examples of embodiments. In particular, FIG. 6 depicts a method 600 that may be carried out at least in part by the server 106. With respect to the user-directory records, as explained above and as depicted in FIG. 4, each record includes at least two attributes. Each of those attributes may take the form of a string of one or more characters.

Some examples of attributes that may be included in the records are first name, last name, middle name, middle initial, extension, telephone number, title, suffix, position, department, and location. Example values for the title attribute include "Mr.", "Mrs.", "Ms.", "Dr.," etc. Examples of the suffix attribute include "Jr.," "Sr.," "III," "M.D.," etc. Example positions include "Manager," "Clerk," "Engineer," etc. Example departments include those depicted in FIG. 4, as well as any other types of departments in which people may work. Example locations could be expressed in terms of a building, room, street address, GPS location, city, or any other expression of a location. And other attributes could be used instead or in addition.

With respect to the input strings, each input string is made up of one or more symbols. As explained, each symbol may correspond to a particular key of the packet-based telephone 102. As such, each symbol is associated with a character set. In general, each character set may include one or more numbers, one or more letters, and/or one or more of any other type of characters suited to a particular application. For example, a "7" symbol may correspond to the "7" key on the keypad of the packet-based telephone 102. As explained above, the "7" symbol may be associated with the character set {7, p, q, r, s}. The server 106 may receive these sets of input strings in request messages from packet-based telephone 102 over PDN 108.

With respect to which records match which sets of input strings, a record matches a set of input strings when, independent of the order of the input strings, there is a one-to-one correspondence matching the input strings with an equal number of attributes of the record. Thus, as an example, if a set of input strings had two input strings, then that set of input strings would match records having at least a first attribute (e.g., last name) that matched one of the input strings, and at least one additional attribute (e.g., extension), separate and distinct from the first attribute, that matched the other input string. And different records may match a given set of input strings with respect to different attributes.

With respect to matching input strings to attributes, an input string matches an attribute when the character sets associated with the symbols of the input string include the characters of at least a portion of the attribute on a symbol-by-symbol, character-by-character basis. Thus, for example, recall that the symbol "7" is associated with the character set {7, p, q, r, s}. Furthermore, it can be seen from a conventional telephone keypad that a symbol "6" could be associated with a character set {6, m, n, o}. Thus, an input string such as "76" would match an attribute such as "Smith" because the character set {7, p, q, r, s} includes the character "s" ("S") and the character set {6, m, n, o} includes the character "m". Note that this input string would also match an attribute such as "Ronald" because the character set {7, p, q, r, s} includes the character "r" ("R") and the character set {6, m, n, o} includes the character "o".

As an example of the one-to-one matching criteria explained above, a set of two input strings such as "76_76" would thus match a record having a first-name attribute equal to "Roger" and a last-name attribute equal to "Smith". This set of input strings would also match a record having a first name "Roger", any last name, and an extension such as "7648" because one of the "76" input strings would match the extension, and the other would match the first name. Matching is independent of the order of the input strings in the set of input strings in a request, and is also independent of any ordering of attributes in the records.

With reference to the records of the table 400 of FIG. 4, another example of matching may be illustrated. For example, consider a set of two input strings such as "4_6" with respect to the records depicted in FIG. 4. The symbol "4" could be associated with the character set {4, g, h, i}. This set of input strings would match records (i) 418 ("4" matches "Harry" and "6" matches "Michaels"), (ii) 420 ("4" matches "Harrigan" and "6" matches "Michael"), (iii) 422 ("4" matches "4781" and "6" matches "M" (middle initial)), (iv) 424 ("4" matches "4782" and "6" matches "Marie"), and (v) 426 ("4" matches "Harry" and "6" matches "Madigan").

As shown in FIG. 6, the method 600 begins at step 602, when a set of input strings is provided. The set of input strings consists of a first input string and a second input string. The first and second input strings each consist of one or more symbols, and each symbol is associated with a respective character set. At step 604, database records are provided. Each record comprises two or more attributes, each of which comprise one or more characters.

At step 606, a first list of records is identified in response to the first input string. Each record of the first list includes an attribute that matches the first input string. As explained, an attribute matches an input string when, on a character-by-character, symbol-by-symbol basis, the characters of at least a portion of the attribute are elements of the character sets associated with the symbols of the input string. In this example, that portion is an initial portion of the matching attributes, though this is not necessary. And note that different records in the first list may match the first input string with respect to different attributes, such as some records in the first list matching last name to the first input string, with other records in the first list matching extension to the first input string.

At step 608, a second list of records from the first list is identified in response to the second input string. Each record of the second list includes two separate and distinct attributes wherein, independent of the order of the input strings, one of the two attributes matches the first input string and the other of the two attributes matches the second input string. Again, different records in the second list can match the first and second input strings with respect to different attributes. For example, some records in the second list may have a last name that matches the first input string and an extension that matches the second input string, while other records in the second list may have an extension that matches the first input string and a middle name that matches the second input string. And many other possibilities clearly exist. At step 610, dynamically-updated subsets of the first and second lists are provided to a packet-based telephone for display. These steps are further explained in the following subsections.

i. Providing a Set of Input Strings

At step 602, a set of input strings is provided. The set of input strings of step 602 consists of a first input string and a second input string, each of which consist of one or more symbols. Each symbol is associated with a respective character set, and may further be associated with a particular key of the packet-based telephone 102. Furthermore, the character set associated with each respective symbol may include one or more digits and/or one or more letters associated with the particular key of the packet-based telephone 102.

Step 602 may take the form of the packet-based telephone 102 sending multiple messages to the server 106. In some embodiments, the packet-based telephone 102 may send a request message to the server 106 in response to each keystroke entered by a user. In other embodiments, the packet-based telephone 102 may send request messages to the server 106 in response to input-string-delimiting keystrokes. And other possibilities exist.

Furthermore, each of these request messages may include only a most-recently-entered keystroke, in which case the server 106 may maintain a buffer that assembles and stores the first and second input strings received from packet-based telephone 102. However, each of those request messages could also include all of the keystrokes entered by the user during a particular searching sequence, in which case it may not be necessary for the server 106 to store the first and second input strings, enabling a session-less implementation on the server side. Again, many possibilities exist.

If the first input string consists of one symbol, it may correspond to the first key that the user of the packet-based telephone 102 presses when attempting to identify and display a desired user-directory record. In response to that keystroke, the packet-based telephone 102 may transmit to the server 106 a request message that includes the symbol associated with that key.

If the first input string consists of more than one symbol, then that input string arriving at the server 106 could be the result of multiple sequences of (i) the user pressing a key on the keypad of the packet-based telephone 102, (ii) the packet-based telephone 102 sending to the server 106 a corresponding request consisting of a string of symbols associated with the keys pressed up to that point, (iii) the server 106 identifying records that match the input string of symbols in each reply, and (iv) the server 106 sending to the packet-based telephone 102 a reply, corresponding to each request, that contains some or all of the records identified as matching the input string of the corresponding request.

In summary, step 602 involves the packet-based telephone 102 sending one or more messages to the server 106, the result of which is that the first and second input strings have been conveyed to the server 106. This may take place in a character-by-character manner, or perhaps in an iterative manner, according to which the last such message includes the first and second input strings.

ii. Providing Database Records

At step 604, database records are provided. These records may be stored by the server 106 in the manner depicted in the user-directory table 400 of FIG. 4. Another device or manner of storage could be used, however. Each record has two or more attributes, and each attribute includes one or more characters. As explained above, these attributes may include at least one of the following attributes, though others could of course be used as well: first name, last name, middle name, middle initial, extension, telephone number, title, suffix, position, department, and location.

iii. Identifying a First List of Records

At step 606, the server 106 identifies a first list of records in response to the first input string. Each record of the first list includes an attribute that matches the first input string, as explained herein. To restate, an attribute matches an input string when, on a character-by-character, symbol-by-symbol basis, the characters of at least a portion of the attribute are elements of the character sets associated with the symbols of the input string. Step 606 may be carried out by the server 106 upon receipt of the last symbol of the first input string, or perhaps upon receipt of a message that includes the entire first input string.

In this example, the first input string is "6424", which means that, using the table 400 as the universe of records, the first list of records identified in step 606 would have been records (i) 402 ("6424 matches the middle name "Michael" of "Scott Michael Anderson x2678"), (ii) 418 ("6424 matches the last name "Michaels" of "Harry C Michaels x2574"), and (iii) 420 ("6424 matches the first name "Michael" of "Michael John Harrigan x2635").

iv. Identifying a Second List of Records from the First List

At step 608, the server 106 identifies a second list of records from the first list in response to the second input string. Each record of the second list includes two separate and distinct attributes wherein, independent of the order of the input strings, one of the two attributes matches the first input string and the other of the two attributes matches the second input string.

Again, different records can match the input strings with respect to different attributes.

Thus, in this example, the second input string could be just the symbol "4", and the server 106 may receive a message including only that symbol. Alternatively, the server 106 may receive a message including the entire first and second input strings: "6424_4". As such, in this example, step 608 may involve narrowing from the first list above to a second list that includes the records (i) 418 ("6424 matches the last name "Michaels" and "4" matches the first name "Harry" of "Harry C Michaels x2574"), and (ii) 420 ("6424 matches the first name "Michael" and "4" matches the last name "Harrigan" of "Michael John Harrigan x2635"). Record 402 dropped out, as the second input string "4" does not match any attributes of that record. Thus, the second list of records consists of records 418 and 420 of FIG. 4.

v. Providing Dynamically-Updated Subsets of the First and Second Lists to a Packet-Based Telephone for Display At step 610, the server 106 provides dynamically-updated subsets of the first and second lists to the packet-based telephone 102 for display. Thus, in response to some or all of the request messages received by the server 106 from the packet-based telephone 102, the server 106 may send some or all of the records identified as matching the symbols received to that point. Using the above example of receiving "6424" as the first input string and "4" as the second input string, the server 106 may send a subset of the second list of records to the packet-based telephone 102 for presentation of at least part of that subset to a user. Because the user had narrowed their search criteria by entering a first symbol of a second input string, and because the server 106 searched the first list of records (identified in step 606) for records matching both the first and second input strings, and further because of the one-to-one-correspondence search criteria of the present methods, it can be observed that the user is quickly converging on a small set of records containing a desired record, with few keystrokes and few server calls.

vi. Additional Aspects

With that general description of the present methods in mind, additional aspects can be considered.

(1) Relevance Selection and Sorting

As one example, the server 106 may select subsets of the first and second lists by respectively selecting records from the first and second lists that are most relevant to the user of the packet-based telephone 102. Furthermore, the server 106 (or perhaps the packet-based telephone 102) may sort the subsets of the first and second lists in order of decreasing relevance to the user, for presentation to the user in that order.

In this framework, relevance to the user of the packet-based telephone 102 may be defined in any number of ways. One example of a relevance criterion could be the number of times the user of the packet-based telephone 102 has called the users associated with the records of the particular list. One manner of doing so could be by referencing a relevance table such as the relevance table 500 of FIG. 5.

So, using the example outlined above, and assuming that Scott Anderson (associated with the record 402 of FIG. 4) is the user of the packet-based telephone 102, and further using the second list (matching the first and second input strings) as an example, it can be seen that, of the two records (418 and 420) matching both input strings, with respect to Scott Anderson, record 420 (Michael Harrigan) has a relevance value of "4" while record 418 (Harry Michaels) has a relevance value of "3". This may correspond to the fact that Scott Anderson has called Michael Harrigan four times and has only called Harry Michaels three times. Note that this may be a record of the number of times that Scott Anderson has ever called these particular users, or the number of times he has called them since an event such as a system restart, or perhaps the number of times he has called them during a discrete time period, such as the past month.

Other metrics of relevance are possible as well. For example, records may be kept as to how recently a user has called other users, and the most recent may be considered the most relevant. This could be accomplished using timestamps of particular calls, a stacking algorithm where the most recent call would appear first in a list, or using some other programming construct. As another example, users may be considered more relevant if they have a position, department, or location that is the same as or similar to that of the calling party. Furthermore, a relevance table may be updated in response to detecting that a user has called another user. This update may take the form of incrementing a relevance value such as the values shown in FIG. 5, though it may also take the form of placing a called user at the top of the calling party's list, or perhaps updating a timestamp to reflect when a call was made. And many other metrics of relevance may be employed as well.

As another example of an aspect that may be included in particular implementations of the present method, the server 106 may prioritize (for presentation to a user) records that match input strings with respect to a subgroup of attributes, where that subgroup of attributes consists of some but not all of the attributes stored for the user-directory records. This aspect of the present methods may reflect a tendency on the part of users to partially or completely input attributes such as first name, last name, extension, and/or telephone number before they would think to input attributes such as position, department, location, title, etc. As such, records that match this subgroup of attributes could be considered more relevant than others.

(2) Storing and Sharing Lists of Records

Another aspect of some embodiments of the present methods is that one or more of the lists of records that are identified as matching a particular set of input strings may be stored by the server 106 for a certain time period. So, as examples, the first list of records, identified in step 606, may be stored for a first time period. Furthermore, the second list of records, identified in step 608, may be stored for a second time period. Moreover, each of these time periods may last at least until the end of a search session conducted by the user of packet-based telephone 102, during which that user is inputting keystrokes to converge on a desired record.

With this backdrop of storing the first and second lists, the server 106 may then receive a third set of input strings, this set of input strings coming not from the packet-based telephone 102, but from the packet-based telephone 104. If it is the case that (i) the third set of input strings is equal to the first set of input strings and (ii) the first list is still stored, then the server 106 may send a subset of the first list, identified in step 606, to the packet-based telephone 104 for presentation of at least part of that subset to the user of that packet-based telephone. Note that the subset of the first list that is sent to the packet-based telephone 104 may not be equal to the subset of the first list that is sent to the packet-based telephone 102. As one possible reason for this, different records may be more relevant to one user than to another.

Further to this example, if (i) the third set of input strings is equal to the second set of input strings and (ii) the second list is still stored, then the server 106 may send a subset of the second list to the packet-based telephone 104 for presentation of at least part of that subset of the second list to the user of that packet-based telephone;

If, as another possibility, (i) the third set of input strings is equal to the first set of input strings with one symbol appended to the first input string and (ii) the first list is still stored, then the server 106 may (a) identify a third list of at least one record from the first list that matches the third set of input strings and (b) send a subset of the third list to the packet-based telephone 104 for presentation of at least part of that subset to the user of that telephone.

Similarly, if (i) the third set of input strings is equal to the second set of input strings with one symbol appended to either the first input string or to the second input string and (ii) the second list is still stored, then the server 106 may (a) identify a third list of at least one record from the second list that matches the third set of input strings and (b) send a subset of the third list to the packet-based telephone 104 for presentation to the user of that telephone.

As touched on above, any subset of any list that is sent to the packet-based telephone 104 may be generated by selecting records from the particular list that are most relevant to the user of the that particular packet-based telephone. Furthermore, any such subset may be sorted, perhaps by the server 106, by the packet-based telephone 104, or by another entity, in order of decreasing relevance to that particular user, for presentation to that user in that order.

(3) Arbitrary Number of Input Strings

An additional aspect of the present methods, which is explained above but bears explicit repeating, is that they apply to matching any number of input strings with an equal number of attributes. The only limit in a particular implantation to how many input strings could be matched against attributes would be the number of attributes stored for each record. So, as an example, assume that the server 106 received a third set of input strings from the packet-based telephone 102, where that third set of input strings consisted of the first input string, the second input string, and a third input string.

In response, the server 106 identifies a third list of at least one record from the second list that matches the third set of input strings, and sends a subset of that third list to the packet-based telephone 102 for presentation to the user. To reinforce the matching criteria, this identification step would involve identifying records from the second list that have any three separate and distinct attributes where a first one of those attributes matches the first input string, a second one of those attributes matches the second input string, and a third one of those attributes matches the third input string. And thus would be the manner of processing that would occur with any number of input strings and an equal number of attributes.

(4) Limited Message Size and/or Telephone Cache Size, and Initiating Local Processing of Matching Records Another aspect of the present methods is that, at a certain point during the exchange of requests and replies, the number of records that match the input strings entered by the user may fall below a particular threshold, at which point the server 106 may send all of the remaining matching records to the requesting packet-based telephone, so that, from that point forward, the packet-based telephone may locally search those records based on additional inputs from the user. This aspect of the present methods may result in a reduced number of calls to the server 106 by one or more packet-based telephones, and thus in a reduction of traffic on the PDN 108.

Two examples of thresholds that may be considered in this context are (i) a message size for the reply messages that the server 106 sends to the packet-based telephones and (ii) a cache size of the telephones themselves. In other words, the determining factor may be the number of records that can be sent at one time, or the number of records that a given packet-based telephone may be able to handle at one time. Where cache size is used to make such a decision, that value may be communicated to the server 106 by a given packet-based telephone.

Either threshold mentioned above, or any other threshold, may be used to determine how many records of a particular identified list of records may be included in a subset of that list sent to a particular telephone. When it is determined that all remaining matching records may be sent to a packet-based telephone in a single reply message, the server 106 may include all of the remaining records in that reply, and also send an indication that no additional matching records other than those in the particular reply were found. Thereafter, the packet-based telephone may locally search those records. In cases where matching records remain in addition to those sent in a particular reply message, the server 106 may send an indication to the packet-based telephone that conveys that this is the case. Some or all of those additional records may be sent to the packet-based telephone if, for example, the user enters a command to scroll through matching records rather than entering additional narrowing criteria.

b. A Second Example Method

Figure 7:
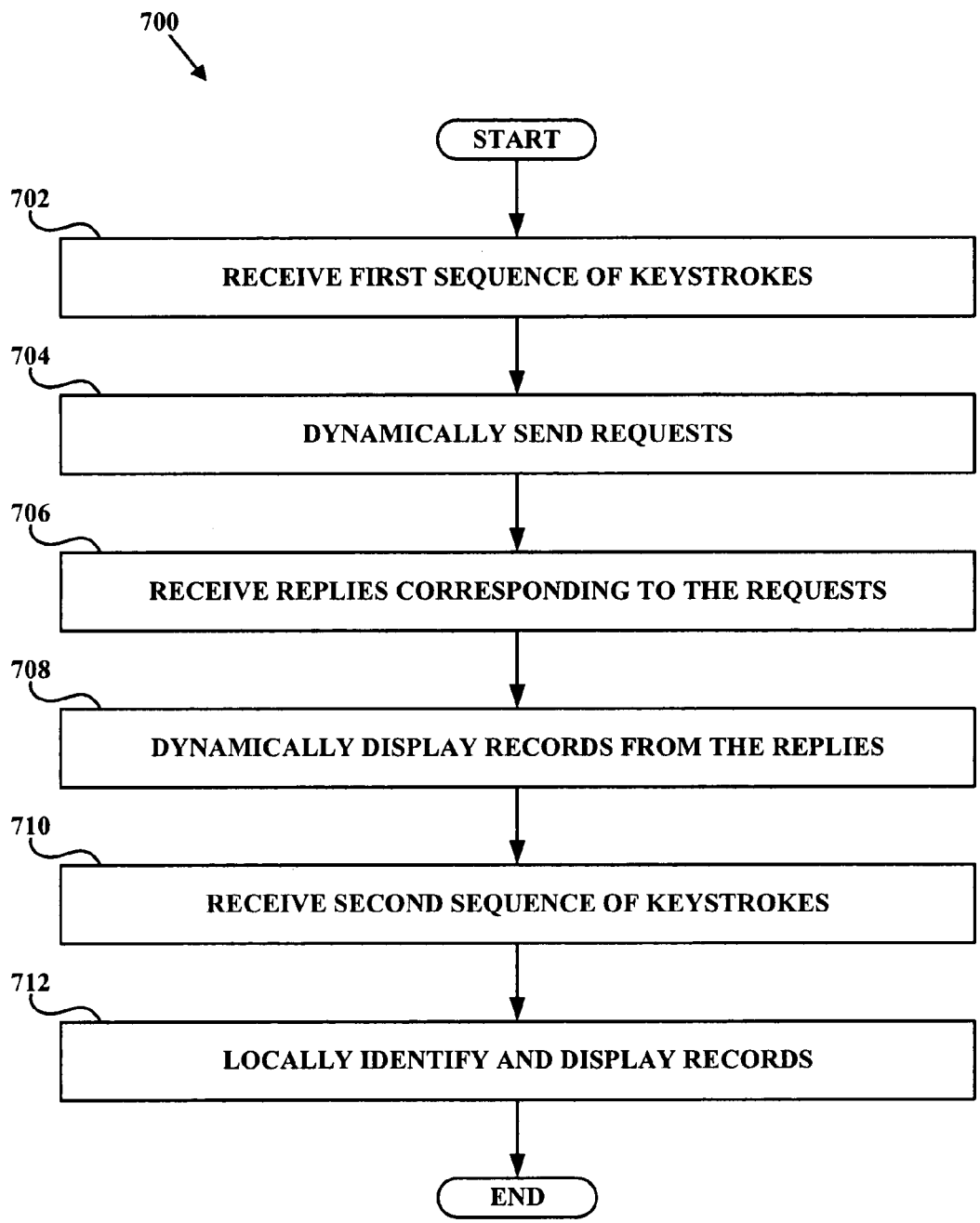
FIG. 7 is a flowchart of a second method that makes use of the communication system of FIG. 1, in accordance with examples of embodiments.

FIG. 7 is a flowchart of a second method that makes use of the communication system of FIG. 1, in accordance with examples of embodiments. The method 700 of FIG. 7 is similar in many respects to the method 600 of FIG. 6, and thus will not be explained in as much detail. Like the method 600, the method 700 is a method of identifying user-directory records that match sets of input strings. Again, each set of input strings includes at least one input string. Each input string includes at least one symbol, and each symbol is associated with a character set. Each of these character sets includes one or more digits and/or one or more letters.

As shown in FIG. 7, the method 700 begins at step 702, when the packet-based telephone 102 receives from a user a first sequence of one or more keystrokes, each of which is associated with a symbol. Each of those symbols is associated with a character set that includes one or more digits and/or one or more letters. As an example, a keystroke could involve the "7" key of a keypad, in which case the keystroke would be associated with the "7" symbol that is in turn associated with, for example, the character set {7, p, q, r, s}.

At step 704, responsive to the first sequence, the first packet-based telephone 102 dynamically sends requests that include the symbols associated with one or more received keystrokes. These requests correspond to—but do not necessarily each include—a set of one or more input strings, each input string made up of one or more symbols. It could be the case that, responsive to each keystroke of the first sequence, the packet-based telephone 102 sends a request to the server 106 over the PDN 108. Each of these requests could includes the symbols associated with the keystrokes received up to that point, delimited into a set of one or more input strings. Alternatively, each of these requests could include only a symbol associated with a most-recently-entered keystroke. And other possibilities exist as well.

At step 706, the packet-based telephone receives replies corresponding to the requests of step 704. Each of those replies includes a list of one or more records that match the set of input strings of the corresponding request. As above, each record has two or more attributes, each of which are made up of one or more characters. Furthermore, the matching criteria may be similar to that described above.

At step 708, responsive to receiving the replies of step 706, the packet-based telephone 102 dynamically displays records from the replies. As an example, the telephone may display the first name, last name, and extension of the first record listed in a reply. Note that this may involve displaying records in order of decreasing relevance to the user. Moreover, a final one of these replies includes an indication, as described above, that there are no records in addition to those from the final reply that match the set of input strings of the corresponding request.

At step 710, the packet-based telephone 102 receives from the user a second sequence of at least one keystroke, each of which is associated with a symbol. Note that the order of steps could vary or overlap. For example, the telephone may receive one or more keystrokes of the second sequence before, at substantially the same time, or after receiving the indication that there are no additional matching records. As one possibility for handling this situation, the packet-based telephone could buffer keystrokes while awaiting a reply from the server 106.

At step 712, responsive to the second sequence of keystrokes, the packet-based telephone dynamically (i) locally identifies lists of records from the final reply that match a concatenation of the symbols associated with the first and second sequences of keystrokes and (ii) displays records from the lists. In so doing, the packet-based telephone may employ processing similar to that of the server 106 as described above. Advantageously, this local searching of the records from the final reply results in a reduction of calls by the telephone to the server, which, taken together with similar processing by other telephones, will reduce network traffic. Furthermore, the local processing may result in a user finding a particular record more quickly.

This local searching of records may involve multiple iterations of the user inputting a keystroke, the telephone searching a most-recently-generated list of records, and the telephone displaying at least part of at least one matching record to the user. Furthermore, while displaying at least part of a particular record, the telephone may receive a command from the user to place a call. The telephone may responsively place a call to an extension associated with the record.

4. Conclusion

Various examples of embodiments have been described above. Those skilled in the art will understand, however, that changes and modifications may be made to those examples without departing from the scope of the claims.

The invention claimed is:

1. A method carried out by a server comprising a communication interface, a processor, and data storage, the method comprising:

the server receiving a set of input strings from a first packet-based telephone, the set of input strings consisting of a first input string and a second input string, the first and second input strings being delimited by a delimiter, the first and second input strings each consisting of one or more symbols, each symbol associated with a respective character set;

the server maintaining a database of user-directory records, each record comprising two or more attributes, each attribute comprising one or more characters;

the server identifying a first list of records in response to the first input string, the first list consisting of the user-directory record or records that have any attribute that matches the first input string, wherein an attribute matches an input string when, on a character-by-character, symbol-by-symbol basis, the characters of at least a portion of the attribute are elements of the character sets associated with the symbols of the input string;

the server identifying a second list of records from the first list in response to the second input string, the second list consisting of the records of the first list that have any additional attribute that matches the second input string wherein, independent of the order of the input strings, independent of the number of symbols in each input string, independent of whether he first input string is the same as or different than the secant input string, and independent of how many characters make up each matching attribute, one of the two attributes matches the first input string and the other of the two attributes matches the second input string, wherein different records can match the input strings with respect to different attributes; and the server providing dynamically-updated subsets of the first and second lists to the first packet-based telephone for display.

2. The method of claim 1, wherein each symbol is associated with a particular key of the first packet-based telephone, and wherein the character set associated with each respective symbol comprises at least one of (i) at least one digit associated with the particular key and (ii) at least one letter associated with the particular key.

3. The method of claim 1, wherein the attributes comprise at least one of first name, last name, middle name, middle initial, extension, telephone number, title, suffix, position, department, and location.

4. The method of claim 1, further comprising:

the server selecting the subsets of the first and second lists by respectively selecting records from the first and second lists that are most relevant to a user of the first packet-based telephone; and the server sorting the subsets of the first and second lists in order of decreasing relevance to the user of the first packet-based telephone, for display in that order.

5. The method of claim 4, wherein the subsets of the first and second lists are selected and sorted based at least in part on at least one criterion selected from the group consisting of (i) how many times the user of the first packet-based telephone has called users associated with the records of the respective list, (ii) how many times within a given time period the user of the first packet-based telephone has called users associated with the records of the respective list, and (iii) how recently the user of the first packet-based telephone has called users associated with the records of the respective list.

6. The method of claim 5, further comprising the server maintaining a relevance table comprising, on a user-by-user basis, at least one statistic selected from the group consisting of (i) how many times the user of the first packet-based telephone has called at least one other user, (ii) how many times within a given time period the user of the first packet-based telephone has called at least one other user, and (iii) how recently the user of the first packet-based telephone has called at least one other user, wherein the subsets of the first and second lists are selected and sorted based at least in part on the relevance table.

7. The method of claim 6, further comprising the server receiving an indication that the user of the first packet-based telephone has placed a call to another user, and the server responsively updating the relevance table to reflect the placing of the call.

8. The method of claim 4, wherein the subsets of the first and second lists are selected and sorted based at least in part on at least one criterion selected from the group consisting of (i) whether the user of the first packet-based telephone works in a position similar to that of users associated with the records of the respective list, (ii) whether the user of the first packet-based telephone works in a department similar to that of users associated with the records of the respective list, and (iii) whether the user of the first packet-based telephone has a location similar to that of users associated with the records of the respective list.

9. The method of claim 4, wherein the subsets of the first and second lists are respectively selected and sorted based at least in part on which records from the first list match the first input string and which records from the second list match the first and second input strings with respect to a subgroup of attributes consisting of some but not all of the attributes.

10. The method of claim 9, wherein the subgroup comprises at least one of last name, first name, extension, and telephone number.

11. The method of claim 1, further comprising the server storing the first list for a first time period and storing the second list for a second time period, wherein, in response to a third set of input strings from a second packet-based telephone:

if the first list is still stored and the third set of input strings consists of the first input string, then the server providing a subset of the first list to the second packet-based telephone for display;

if the second list is still stored and the third set of input strings consists of the first and second input strings, then the server providing a subset of the second list to the second packet-based telephone for display;

if the first list is still stored and the third set of input strings consists of the first input string with one or more symbols appended thereto, then the server (a) identifying a third list of records from the first list, each record of the third list including an attribute that matches the third set of input strings and (b) providing a subset of the third list to the second packet-based telephone for display; and if the second list is still stored and the third set of input strings consists of the first and second input strings with one or more symbols appended to at least one of the first and second input strings, then the server (a) identifying a third list of records from the second list, each record of the third list including two separate and distinct attributes wherein, independent of the order of the input strings of the third set, one of the two attributes matches one of the input strings and the other of the two attributes matches the other input string, wherein different records can match the input strings with respect to different attributes and (b) providing a subset of the third list to the second packet-based telephone for display.

12. The method of claim 11, further comprising:
for any subset of any list that is sent to the second packet-based telephone, the server selecting the subset by selecting records from the list that are most relevant to a user of the second packet-based telephone; and
the server sorting any such subset in order of decreasing relevance to the user of the second packet-based telephone, for display in that order.

13. The method of claim 1, further comprising, in response to a third set of input strings from the first packet-based telephone, the third set of input strings consisting of the second set of input strings with one or more symbols appended to at least one of the first and second input strings:
the server identifying a third list of records from the second list, each record of the third list including two separate and distinct attributes wherein, independent of the order of the input strings of the third set, one of the two attributes matches one of the input strings and the other of the two attributes matches the other input string, wherein different records can match the input strings with respect to different attributes; and
the server providing a subset of the third list to the first packet-based telephone for display.

14. The method of claim 1, further comprising, in response to a third set of input strings from the first packet-based telephone, the third set of input strings consisting of the first input string, the second input string, and a third input string:
the server identifying a third list of records from the second list, each record of the third list including three separate and distinct attributes wherein, independent of the order of the input strings of the third set, a first one of the three attributes matches a first one of the input strings, a second one of the three attributes matches a second one of the input strings, and a third one of the three attributes matches a third one of the input strings, wherein different records can match the input strings with respect to different attributes; and
the server providing a subset of the third list to the first packet-based telephone for display.

15. The method of claim 1, further comprising, based at least in part on at least one of (i) a cache size of the first packet-based telephone and (ii) a message size, the server determining how many records from a given list to include in a subset of the given list.

16. The method of claim 15, further comprising:
the server checking whether, based at least in part on at least one of the cache size and the message size, the subset of the second list can include all of the records from the second list;
if the subset of the second list can include all of the records from the second list, then the server (i) including all of the records from the second list in the subset of the second list and (ii) sending an indication to the first packet-based telephone that there are no matching records in addition to the records in the subset of the second list, such that the first packet-based telephone thereafter locally searches the subset of the second list for desired records; and
if the subset of the second list can not include all of the records from the second list, then the server (i) including less than all of the records from the second list in the subset of the second list and (ii) sending an indication to the first packet-based telephone that there are matching records in addition to the records in the subset of the second list.

17. The method of claim 1, further comprising:
the server receiving a series of input strings, the series consisting of (i) an initial input string consisting of an initial symbol and (ii) a first number of subsequent input strings, the first number being an integer greater than or equal to zero, each of any subsequent input strings consisting of a most-recently received input string with one or more symbols appended thereto, the series concluding with the first input string of claim 1;
the server identifying an initial list of records in response to the initial input string, each record of the initial list including an attribute that matches the initial input string;
the server providing a subset of the initial list to the first packet-based telephone for display, wherein if the first number is equal to zero, then the initial list is the first list of claim 1; and
if the first number is greater than zero, then in response to each subsequent input string, the server:
(i) identifying, from the list of records identified as including an attribute that matches the most-recently-received input string, a list of records that include an attribute that matches the subsequent input string; and
(ii) providing a subset of each such list to the first packet-based telephone for display, wherein the last such list is the first list of claim 1.

18. The method of claim 17, further comprising the server maintaining a plurality of pre-populated lists of records, wherein a particular one of the pre-populated lists is the initial list, and wherein identifying the initial list comprises accessing the particular pre-populated list.

19. The method of claim 1, wherein the server receiving a set of input strings comprises the server receiving from the first packet-based telephone, in response to each of a series of keystrokes, a concatenation of all of the keystrokes entered to that point.

20. The method of claim 1, wherein the server receiving a set of input strings comprises the server receiving from the first packet-based telephone, in response to each of a series of keystrokes, only the most-recent keystroke.

21. A method of identifying user-directory records, the method comprising:
a first packet-based telephone receiving a first sequence of one or more keystrokes, each keystroke associated with a symbol, each symbol associated with a character set, each character set comprising at least one of (i) one or more digits and (ii) one or more letters;
responsive to the first sequence, the first packet-based telephone dynamically sending to a server requests that (i) comprise the symbols associated with one or more received keystrokes and (ii) correspond to a set of two or more input strings, the input strings being delimited by delimiters, each input string consisting of one or more symbols;
the first packet-based telephone receiving from the server replies corresponding to the requests, each reply comprising a list of one or more records that match the set of input strings of the corresponding request, each record comprising two or more attributes, each attribute comprising one or more characters, wherein a record matches a set of two or more input strings when, independent of the order of the input strings, independent of the number of symbols in each input string, independent of whether the first input string is the same as or different than the second input string, and independent of how many characters make up each matching attribute, there is a one-to-one correspondence matching the input strings with an equal number of attributes of the record, wherein an attribute matches an input string when, on a character-by-character, symbol-by-symbol basis, the characters of at least a portion of the attribute are elements of the character sets associated with the symbols of the input string, wherein different records can match the input strings with respect to different attributes;

the first packet-based telephone, responsive to the replies, dynamically displaying the records from the replies, wherein a final reply comprises an indication that there are no records in addition to the records of the final reply that match the set of input strings of the corresponding request;

the first packet-based telephone receiving a second sequence of one or more keystrokes; and the first packet-based telephone, responsive to the second sequence, dynamically (i) locally identifying lists of records from the final reply that match a concatenation of the symbols associated with the first and second sequences of keystrokes and (ii) displaying the records from the lists.

22. The method of claim 21, wherein the first packet-based telephone displaying records comprises the first packet-based telephone displaying records in order of decreasing relevance to a user.

23. The method of claim 21, further comprising the first packet-based telephone, while displaying a particular record, receiving a place-call command from a user and responsively placing a call to at least one of an extension and a telephone number associated with the particular record.

* * * * *